United States Patent [19]

Strommer

[11] Patent Number: 5,137,946
[45] Date of Patent: Aug. 11, 1992

[54] PROCESS FOR PREPARING A BITUMINOUS BINDER MODIFIED WITH PLASTIC FOR BUILDING MATERIALS

[75] Inventor: Erich Strommer, Schattendorf, Austria

[73] Assignee: Novophalt Overseas S.A., Luxembourg

[21] Appl. No.: 588,145

[22] Filed: Sep. 26, 1990

Related U.S. Application Data

[63] Continuation-in-part of Ser. No. 215,038, Jul. 5, 1988, Pat. No. 4,988,747.

[51] Int. Cl.⁵ ............................................. C08K 5/01
[52] U.S. Cl. ...................................... 524/59; 524/68; 524/70; 524/71
[58] Field of Search ................. 524/59, 70, 71, 68, 524/69

[56] References Cited

U.S. PATENT DOCUMENTS

| | | | |
|---|---|---|---|
| 4,314,921 | 2/1982 | Beigenzein | 523/324 |
| 4,567,222 | 1/1986 | Hagenbach et al. | 525/54.5 |
| 4,988,747 | 1/1991 | Strommer | 524/59 |

FOREIGN PATENT DOCUMENTS

| | | | |
|---|---|---|---|
| 3202480 | 8/1983 | Fed. Rep. of Germany | 525/54.5 |

*Primary Examiner*—Robert E. Sellers
*Attorney, Agent, or Firm*—Leydig, Voit & Mayer

[57] ABSTRACT

A process for the production of a binder modified with thermoplastic synthetic material and a modified binder for building materials, especially road construction type materials are provided, in which for the formation of the binder, molten bitumen together with a thermoplastic material mixture, preferably an olefin polymer, are subjected to a homogenization treatment. The mixture containing bitumen and the thermoplastic material is rapidly accelerated followed by rapid braking. By this acceleration there is supplied to the mixture containing the bitumen and a thermoplastic material, in the form of kinetic energy, an amount of energy corresponding to the difference between the treatment temperature and the disintegration temperature of the thermoplastic material to form readily reacting molecular fragments of the thermoplastic material.

12 Claims, 4 Drawing Sheets

PROCESS FOR PREPARING A BITUMINOUS BINDER MODIFIED WITH PLASTIC FOR BUILDING MATERIALS

RELATED APPLICATIONS

This application is a continuation-in-part application of U.S. Ser. No. 07/215,038, filed Jul. 5, 1988, now U.S. Pat. No. 4,988,747, issued Mar. 12, 1990.

FIELD OF THE INVENTION

The present invention relates to a process for the production of a bituminous binder modified with thermoplastic synthetic material for use as a binding agent of a construction material, such as a street building material, in which process during the production of the binder melting liquified bitumen, together with a thermoplastic material or a mixture of thermoplastic materials is subjected to a homogenization treatment.

BACKGROUND OF THE INVENTION

A number of processes for the production of bituminous binders of the aforementioned type are known. When ordinary bitumen is combined with a thermoplast or thermoplastic material an improvement in the properties of the binder is accomplished. Such modification of the bitumen often requires a relatively great expenditure of time, energy and labor because a number of different thermoplastic materials, whose addition to bitumen is capable of improving its properties considerably, are not readily soluble in bitumen. Accordingly, it is difficult to achieve uniform dispersion or homogenization of these materials. Although there do exist thermoplastic materials suitable for the modification of bitumens which have better solution properties in bitumens, these thermoplastic materials are often expensive. Moreover, construction materials produced with binders that contain such soluble thermoplastic materials often have lower physical strength than those construction materials whose binder is a bitumen treated with relatively non-soluble thermoplasts.

Known processes for combining bitumen and types of thermoplastic materials which are not readily soluble in bitumen involve heating a mixture of bitumen and thermoplastic material to a high temperature, typically at least 240° C. and in some instances over 310° C. This causes the molecules of thermoplastic material to disintegrate into fragments which, upon stirring, are dispersed in the bitumen. In some processes, such a treatment is carried out over a period of several hours, or even days. Such processes which involve high temperatures, while providing greater solubility or dispersion, have the shortcoming that the bitumen itself undergoes some disintegration. In many instances it is difficult to predict the sensitivity of a bituminous material to heat, batch to batch variations being very common.

Most known methods of preparing bituminous/thermoplastic composition attempt to mix a heated bituminous/thermoplastic mixture only enough to ensure thorough mixing. All such processes, however, have the disadvantage that the total mechanical energy used for mixing has been difficult to determine correctly, resulting in products having inferior mechanical properties. For example, in those cases in which too little stirring or energy feed has been used, products having poor physical properties are produced and in those case in which too high an energy feed has been employed, an unnecessary expenditure of energy or excessively severe disintegration, especially of the bitumen results. A process is described in U.S. Pat. No. 4,314,921 which process allows the treatment time to be shortened by using forceful mixing under high shearing force. However, this process requires the mixture to be subjected to a temperature of between about 260° C. to 310° C.

The prior art methods for mixing utilize an intensively driven force, whereby a mixture, such as a mixture of bitumen and polyethylene, are subjected to a combined thermal and mechanical load. Upon completion of this mixing there is found a weakening of the spectral lines of the X-ray spectrum which relate to the characteristics of the crystal structure of the synthetic material constituent, assuming, of course, the treatment has been continued long enough at the disintegration temperature of the constituent or constituents.

BRIEF SUMMARY OF THE INVENTION

It is an object of the present invention to provide a process of the type mentioned above using relatively non-soluble thermoplastic materials, e.g., polyolefins such as polyethylene, which makes it possible to not only achieve a rapid run-off of the homogenization process, but also yields a bituminous binder which presents clearly better physical properties than like or similarly composed bituminous binders which have been produced with known processes.

To accomplish this objective the process of the present invention provides combining molten bitumen with a thermoplastic material having a molecular weight greater than that of said bitumen to form a mixture and mixing the bitumen and thermoplastic material mixture to effect homogenization by rapid acceleration followed by rapid braking of the mixture. By said rapid braking highly reactive molecular fragments of the thermoplastic material(s) at significantly lower temperatures than in prior art processes are produced. There is supplied a given amount of kinetic energy corresponding to at least the difference between the treatment temperature and the disintegration temperature of the thermoplastic material(s). The term "treatment temperature" is defined as the temperature of the mixture as macroscopically measured by conventional means. The term "disintegration temperature of the thermoplastic material(s)" is defined as the temperature at which the molecules of the thermoplastic material(s) disintegrate into fragments, these fragments then entering into a reaction with the bitumen, thereby forming new substances.

According to the present invention, a mixture of a bituminous material and a thermoplastic material is rapidly accelerated to high velocity followed by rapidly braking or stopping the material by causing the material to impinge or strike a impact surface.

By the procedure of the present invention, the above-mentioned goal can be met and the production of binders using bitumen and modifying thermoplastic materials may be achieved—despite the fact that these thermoplastic materials may be, per se, relatively insoluble in bitumens—in a relatively short time, with less expenditure of energy and at lower operating or treatment temperatures. Depending on both the type of bituminous and thermoplastic materials used, typical operating or treatment temperatures below 200° C., and frequently and preferably below 170° C., may be used. Although low temperatures are used, the process according to the present invention achieves not only minimal decomposition of bituminous materials but also the desired selective disintegration of thermoplastic material and the concomitant formation of an homogeneous mixture and the physical properties associated therewith. Furthermore, through this modification additional improvements in the properties of the binder may be achieved, for example, improvements in the adhesion of the binder to gravel, sand and rock material and in the strength of the construction materials generated with such a binder.

The rapid acceleration which increases the velocity of the mixture results in an increase of the kinetic energy of the mixture (K.E. = $\frac{1}{2}mv^2$). The abrupt braking of the components of the mixture causes a conversion of kinetic energy to thermal energy. The molecular weight of the thermoplastic material is relatively high (up to about a million) and that of the bitumen is relatively low (about 2,500) but both have the same velocity. Since the molecular weight (often also called "molecular mass") of the thermoplastic material is significantly higher than that of the bituminous material, the kinetic energy of the molecules of the thermoplastic material is higher than the kinetic energy of the molecules of the bituminous material. Accordingly the rapid braking which converts the kinetic energy into heat movement of the molecules causes the thermoplastic material molecules to have a much higher instant thermal energy than the molecules of the bituminous material. As a result, the thermoplastic material shows a much greater tendency to disintegrate into reactive fragments than does the bituminous material. The impact of the molecules of the bitumen does not cause substantial heating because the molecular weight of the bitumen is low. A considerable portion of the thermal energy of the thermoplastic material molecules that has been produced by the impact is consumed for the disintegration of the thermoplastic molecules. For that reason and because the relative proportion of the thermoplastic material is relatively low compared to the bituminous material (on the order of about 20% or below), the temperature of the entire mixture does not rise significantly after the impact.

DETAILED DESCRIPTION OF THE INVENTION

Figure 1:
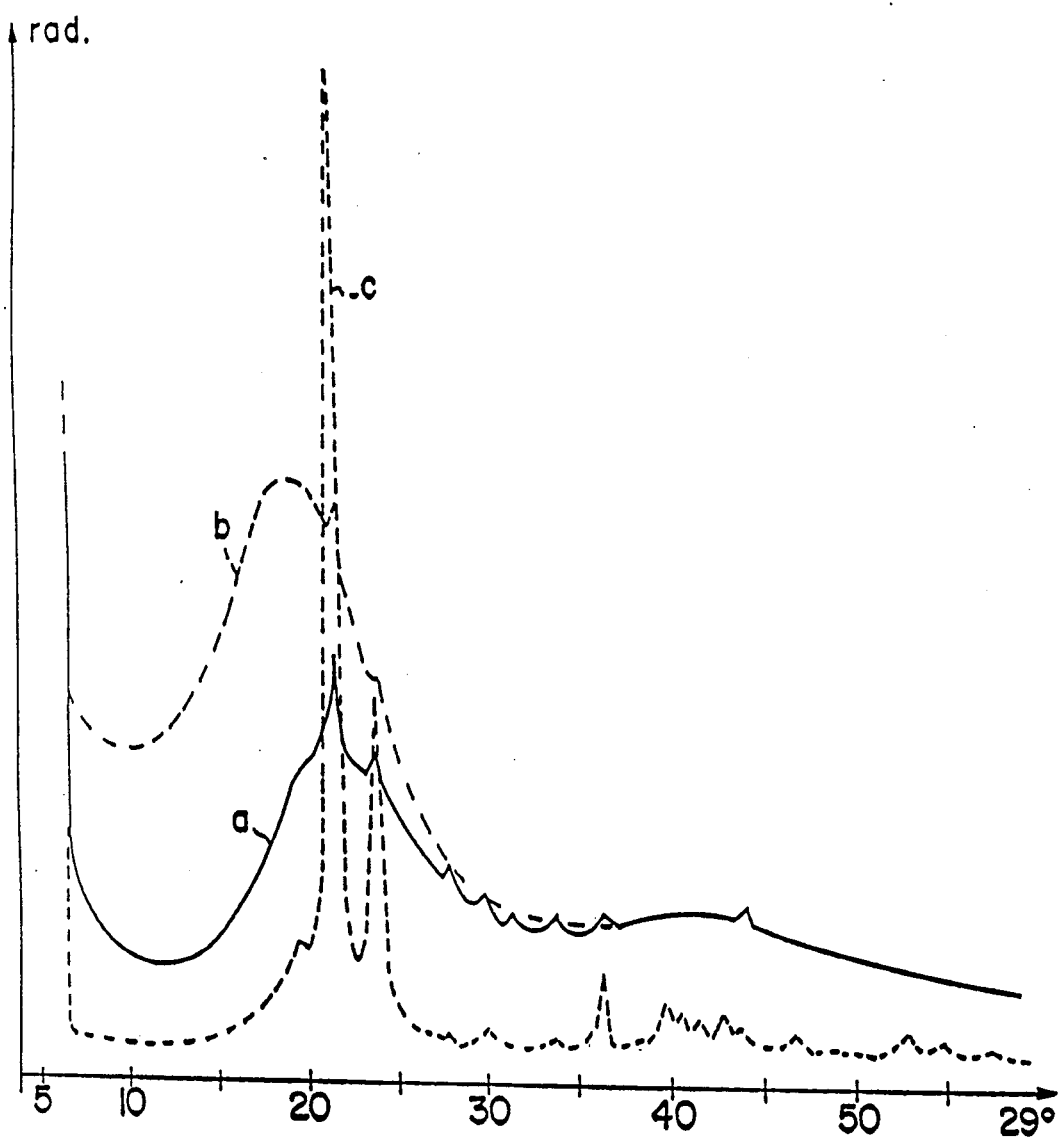
FIG. 1 is an X-ray spectra of various substances.

The present invention makes it possible to use the energy employed to mix the components of the system with the least possible deterioration of the bituminous and thermoplastic materials, especially of the bitumen, while still allowing for the desired regulated decomposition of the thermoplastic material(s) contained in the mixture.

While some variation in the proportions of the components of the mixture of bituminous and thermoplastic materials may be employed, depending upon the properties of the particular bituminous and thermoplastic materials employed and the particular application, typically the thermoplastic material will be present in amounts of about 20% by weight, or less with the remainder of the mixture being bitumen. Quite suitably, the thermoplastic material will be present in amount of about 15%, by weight, or less. The preferred concentration of thermoplastic material is about 3.5 to 8% by weight with the bitumen being present in an amount of 96.5% to 92%, by weight, most preferably the thermoplastic material is present in amount of 6%, by weight and the bitumen is present in an amount of 94%, by weight.

Any system which is capable of accelerating a molten mixture of thermoplastic and bituminous materials to a high velocity and subsequently braking the mixture by contact with an impact surface may be employed in the present invention. A preferred system includes a rapidly rotating wheel or plate to which a molten mixture of bituminous and thermoplastic materials are supplied. The mixture is fed to an area of the wheel or plate at or approximate the center of the wheel or plate from which the mixture, under the influence of centrifugal force, migrates to the edge of the wheel or plate whence it is flung against an impact surface.

An embodiment of the process of the invention comprises, in addition to rapidly braking the material, driving the mixture containing bitumen and at least one thermoplastic material through a narrow gap existing between two mixing tools, on the average having a width less than 3 mm, and preferably a width less than 0.3 mm. These tools stand opposite to one another and are preferably arranged coaxially. The processing of the mixture by abrupt braking of the accelerated mixture and/or working of the mixture through this gap, which is preferably interrupted by pauses after each gap run-through, is continued until a clear structural change in the mixture is ascertainable, for example, from the X-ray spectrum lines of the mixture.

It should be understood that the data given above regarding the width of the gap between the mixing tools are only average values. The gap can also be interrupted by recesses, grooves or the like. However, the greater spacing present due to the presence of such recesses or grooves on the mixing tools is not to be taken into account when determining the average gap width.

As a consequence of the molten mixture of bitumen and thermoplastic synthetic material being accelerated and rapidly braked and/or driven through a narrow gap, such as that described previously, there exists, besides the thermal influence, a special kinetic energy stress on the mixture which affects especially the thermoplastic component. In the decomposition of the thermoplastic material molecules which occur under these loads shorter molecular fragments originate which have a strong tendency to react further.

In the examination of a mixture treated according to the process of the present invention, there appears to be clearly recognizable X-ray spectrum lines which indicate the presence of a new crystal type structure. Corresponding to this appearance of X-ray spectrum lines, which indicate this new crystal structure, construction materials that have been manufactured with a binder produced using the method of the present invention have better mechanical properties than those building materials that have been formed according to prior art with binders in which bitumen and thermoplastic synthetic material have been mixed with one another by intensive agitation while in the molten state.

Moreover, there exists a further advantage of the aforementioned inventive procedure. This manner of production of the bituminous binder which has been modified with thermoplastic synthetic material may be carried out in a shorter time when compared to those methods and materials presently in use. In addition, and possibly most importantly, it is possible to work the aforementioned synthetic thermoplastic material and bitumen mixture at a lower mean temperature or treatment temperature than is possible using the known homogenizing of such a mixture by intensive agitation. It should now be recognized that this is possibly due to the fact that, on the one hand, the thermoplastic synthetic material molecules undergo a mechanical stretching during rapid braking of the accelerated mixture and/or driving of the mixture through a narrow gap and, on the other hand, the particles of the thermoplastic synthetic material are heated substantially higher than the bitumen in a short time by the forces acting on the mixture, this being due to the thermoplastic material's higher molecular weight. This brief heating is sufficient to divide the molecules of the thermoplastic synthetic material into highly reactive fragments. Such fragments then combine into a partially crystalline structure. This change is evidenced upon comparing the X-ray lines with respect to the state present before the abrupt braking of the accelerated mixture and/or driving of the mixture through the gap, and those lines present after this treatment has been made. Because the structure, which is at least partly crystalline, arises in the bitumen it is also closely interwoven with the bitumen.

The close interweaving of the thermoplast with the bitumen can also be perceived from the behaviour of a binder produced according the invention in a relatively long-lasting hot storage A mixture of the bitumen and thermoplast treated according to the process of the invention upon illumination with light within the visible wavelength range is visually homogeneous immediately after its production and shows upon illumination with ultraviolet light a dense pattern of bright points on a darker background. After hot storage for many hours at a temperature that is clearly above the melting temperature of the thermoplast, the particles previously visible as points unite to form a bright cover layer whose volume is about four to eight times the volume of the thermoplastic constituent of the mixture. Upon simple brief stirring, this cover layer can be combined again with the remaining part of the binder into a visually homogeneous substance. This behavior differs clearly from the behavior of a homogenized product obtained using the prior art method of long stirring of a molten mixture. In such a product, after hot storage for a number of hours, a bright cover layer is formed whose volume corresponds approximately to the volume of the thermoplastic constituent of the mixture, and for the rehomogenizing of the cover layer with the main part of the material from which the cover layer has separated, virtually the same agitating work is required as has been expended in the first homogenizing mixing procedure.

In the embodiment of the present invention in which the bituminous/thermoplastic mixture is forced through a gap, the two mixing tools between which the aforementioned gap lies, through which the mixture intended for the formation of the binder is driven, should rotate relative to one another. This can be accomplished simply by fixing one mixing tool and rotating the other. It is also possible, however, for both mixing tools to rotate, either in opposite turning directions or with the same turning direction but at different speeds of revolution.

It is especially preferable if the mixture containing the bitumen and thermoplastic synthetic material is driven through a gap between the mixing tools that the gap have an average width of about 0.1 mm or narrower. By processing the mixture to be homogenized through a very narrow gap, it is possible to further intensify the decomposition of the thermoplastic synthetic material leading to the production of the highly reactive molecular fragments that show a special tendency to recrystallize. It has been determined that it is possible to achieve this effect at lower mean temperatures of the mixture by decreasing the gap width. It is also advantageous to form the gap in such a way so that the mixture in the gap is subjected to pressure built up by hydrodynamic action.

As indicated above, the decomposition of the synthetic material molecules and the formation of the reactive fragments can be achieved by the application of high centrifugal forces on the mixture of bitumen and thermoplastic synthetic material. Toward this end, it is very favorable to impart to the mixture a velocity of revolution as high as possible and then brake the mixture from this velocity in a brief period of time. The decomposition of the synthetic material molecules due to these forces can be explained in the following manner. The synthetic material molecules, with their high molecular mass, take on a high velocity under the influence of the centrifugal forces and thus gain a high kinetic energy ($mv^2/2$). The energy arising during rapid braking is transformed and used to achieve a very high instant temperature equivalence. Fortunately, these high velocities and the energies or temperatures arising from the braking occur during only very brief periods of time, so that no disadvantageous disintegration of the thermoplastic synthetic materials arises. Moreover, the bitumen does not experience, practically speaking, any adverse effects corresponding to this brief period of high heating, this being due to the bitumen having a much lower molecular mass than the thermoplastic synthetic substance present in the mixture.

The kinetic energy of the molecules, which is derived from the mass and from the square of the velocity (K.E.$=\frac{1}{2}mv^2$), is proportional to the absolute temperature of these molecules. In the method of the present invention, treatment of a bitumen/thermoplastic material mixture with abrupt braking in which molecules are present whose molecular masses differ markedly, for example by a factor of about 20, causes a difference in the instant temperature rise that corresponds to this factor. In such situations, the molecules with the lower molecular mass undergo a smaller temperature change and the molecules with the higher molecular mass undergoing a greater temperature increase, but both experience the same velocity.

In one embodiment of the invention, it is preferred that the mixture be driven through a gap running radially at least at the emergence edge between two coaxially rotating mixing tools. An especially good result may be achieved if the mixture is abruptly braked on an impact surface in the gap zone, preferably immediately after its emergence from the gap, since this results in the high velocity imparted to the mixture corresponding to a state of particularly efficient brief high heating.

Figure 3:
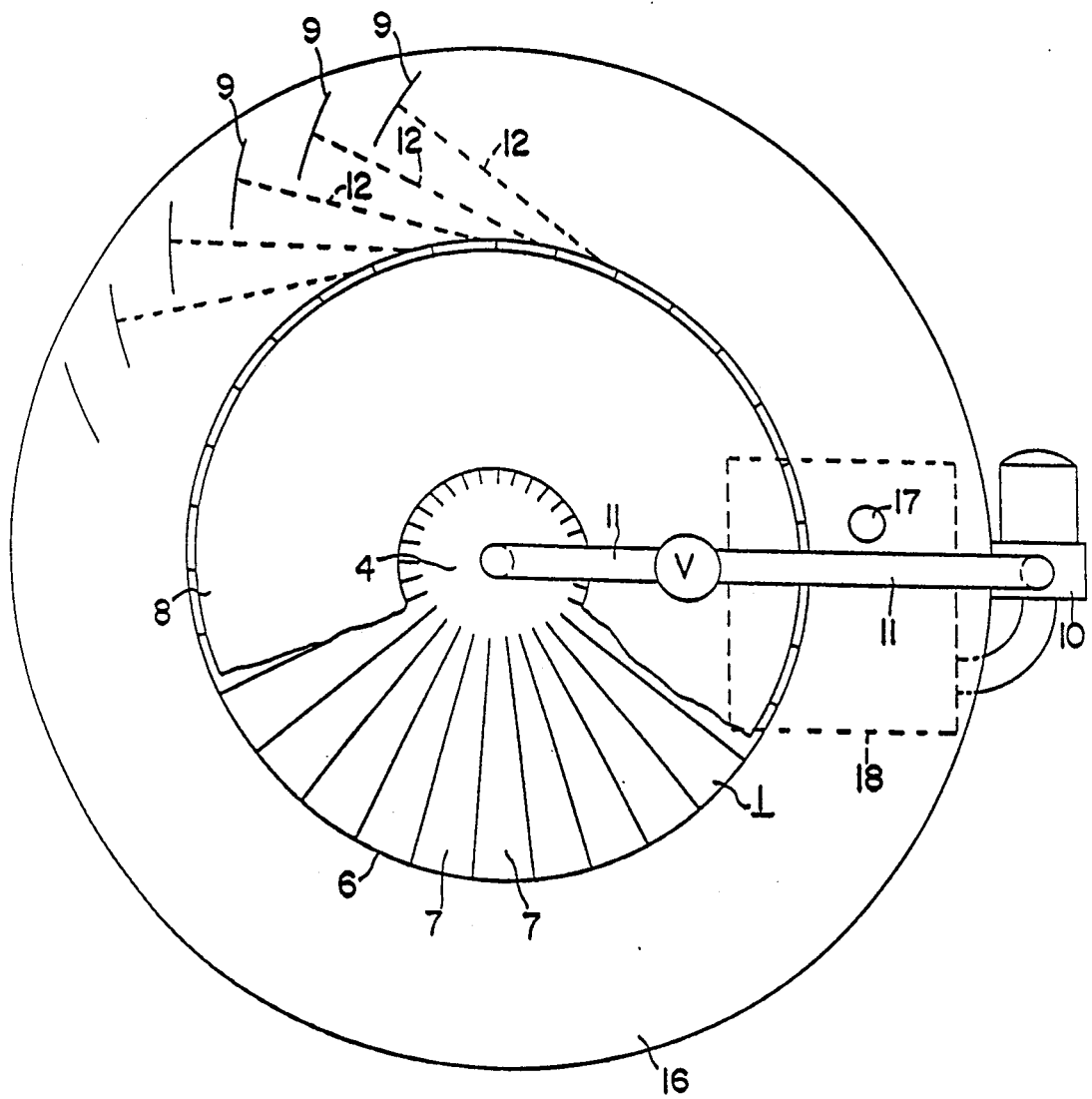
FIG. 3 is a schematic sectional front elevational view of an apparatus used to rapidly accelerate and to rapidly brake a molten mixture of thermoplastic and bituminous materials in an embodiment of the present invention.
Figure 4:
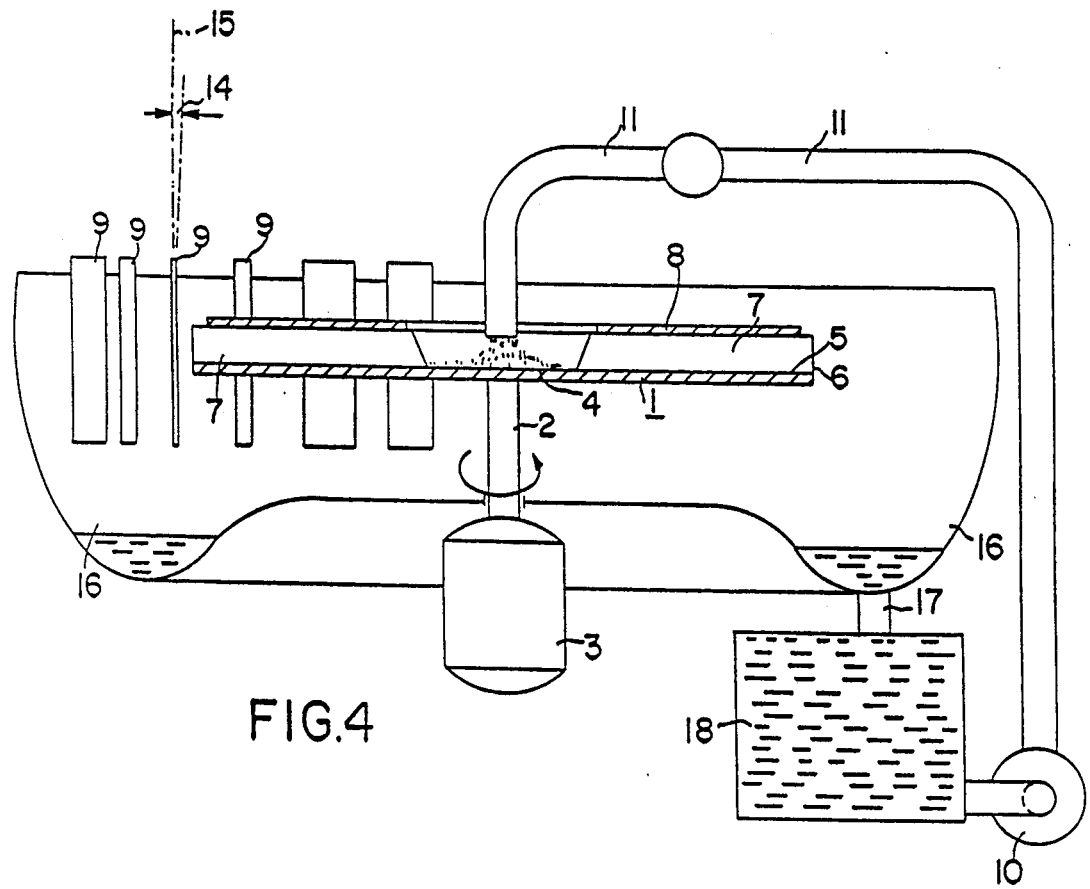
FIG. 4 is a schematic plan view of the apparatus illustrated in FIG. 3.

FIGS. 3 and 4 illustrate an apparatus which may be used in the process of the present invention to accelerate a molten mixture of bituminous and thermoplastic materials and to abruptly brake this mixture. The apparatus includes a centrifugal wheel or plate 1 mounted on a shaft 2 that is rotationally driven by a motor 3. The molten mixture is supplied to the center 4 of the upper surface 5 of the plate 1. When the device is operative and the plate 1 is rotating, centrifugal force causes the mixture to migrate to the circumference 6 of the plate. Radially extending grooves 7 are provided on the surface 5 to guide the molten mixture to the periphery or circumference 6 of the plate 1. An annular lid 8 is provided over the grooves 7. Although a single continuous annular surface may be provided as an impact surface arranged coaxially and surrounding plate 1, separate impact surfaces 9 (only some of which are depicted in FIGS. 3 and 4) arranged substantially normal to the direction of movement of portions of the bituminous/thermoplastic materials mixture flung from the circumference 6 of the wheel 1 are preferred. The directions of movement in which the mixture is flung from the rotating wheel 1 are indicated in FIG. 3 by dashed lines 12.

The molten mixture is conducted to the center of the centrifugal wheel 1 by a pump 10 and pipe 11.

A vertical orientation of the impact surfaces generally promotes the discharge or recovery of the bituminous/thermoplastic materials mixture from the impact surfaces 9. Recovery of the mixture may be further assisted by arranging the impact surfaces 9 with a very small angle of inclination 14 with respect to the vertical direction 15 (FIG. 4). This angle is generally only about a few degrees in order to maintain the energy converting effect of impact of the mixture with the impact surfaces 9.

Adjustment of the rate of feeding the bituminous/thermoplastic materials mixture may be made to obtain uniform conditions on the impact surfaces 9. Such adjustment may be made to prevent accumulation of the mixture on the impact surfaces and to assure facile removal of the mixture therefrom.

To assist in the removal of the mixture from the impact surfaces 9, an annular trough 16 is provided below the centrifugal wheel 1 as the mixture drains from the impact surfaces 9.

The annular trough 16 is connected by conduit means, such as a pipe 17, to a reservoir or collecting vessel 18. The mixture is recycled by pump 10 and pipe 11 to the center of the plate 1.

Figure 5:
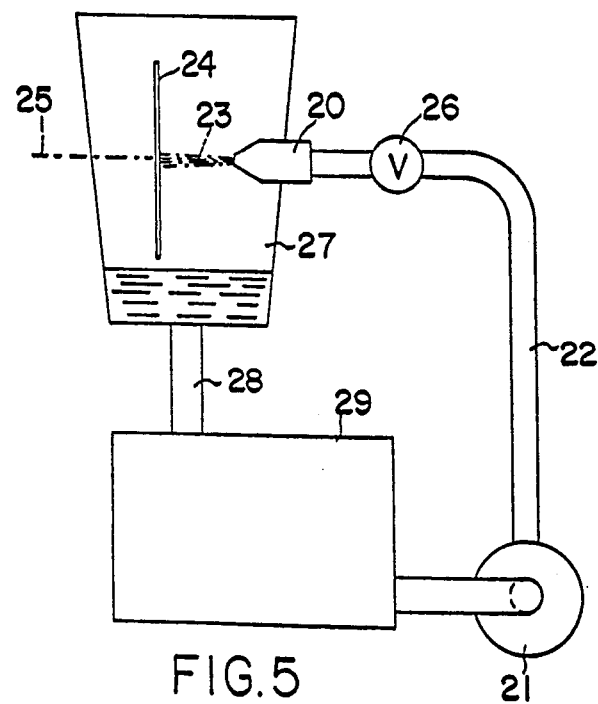
FIG. 5 is a schematic view of another apparatus which may be used in the present invention.

Another embodiment of an apparatus suitable for use in the present invention is shown in FIG. 5. This apparatus includes at least one nozzle 20 which is supplied with a molten mixture of bituminous and thermoplastic material by a motor driven pump 21 and a conduit means, such as a pipe 22. A high velocity jet 23 of the molten mixture emerges from the nozzle 20 and impinges on an impact surface 24 arranged substantially normal or perpendicular to the geometrical axis 25 of the jet 23. As in the embodiment of the apparatus illustrated in FIGS. 3 and 4, the apparatus shown in FIG. 5 benefits from a small inclination of the impact surface 24 from the vertical. This allows the molten mixture to more readily drain from the impact surface.

As with the apparatus shown in FIGS. 3 and 4, the embodiment illustrated in FIG. 5 permits adjustment of feeding by controlling the pump 21 or by using a control valve 26 located between the motor driven pump 21 and nozzle 20. This permits uniform conditions to be obtained at the impact surface.

To obtain a greater capacity of a blended mixture of thermoplastic and bituminous materials, a plurality of nozzles may be employed. Alternatively, greater capacity may also be achieved by using a nozzle having a slit at its outlet end which forms a flat jet rather than a nozzle which has a circular configuration at its outlet end. The molten mixture of bitumen and thermoplastic material which is discharged or drained from the impact surface 24 is collected in a trough 27 which communicates with a reservoir or vessel 29 through conduit means, such as a pipe 28. The mixture in the reservoir 29 is recycled to the nozzle 20 by means of the pump 21 and conduit 22.

The invention is further explained with the aid of examples, having reference to the drawings.

EXAMPLE 1

A molten mixture which consisted of 94% wt. of bitumen B 100 and 6% wt. of high density polyethylene was first lightly agitated in a supply container. This mixture was fed from the supply container to a run-through mixing apparatus which had two plate-form mixing tools standing opposite one another in which the one mixing tool was at a standstill and the other was rotatably arranged coaxially to the first and was connected to a driving means. Both the standing mixing tool and the rotating mixing tool were provided with ribs on sides facing one another. On the facing sides of the two mixing tools there was a gap of about 0.1 mm between the ribs of the one mixing tool and the ribs of the other mixing tool through which the mixture to be treated was driven. The circumferential velocity of the rotating mixing tool at the outer edge of the gap was about 30 m/sec. Likewise, the flow velocity of the mixture through the gap was about 30 m/sec. The mixture was driven six times through the run-through mixing apparatus, requiring about 20 minutes. The bituminous binder thus obtained was mixed with a preheated rock material and rock meal filler with a standardized composition for asphalt concrete 0–8. Using the construction material thus obtained in standardized procedure, Marshall test bodies were produced which were thereupon examined for their mechanical properties. The measurement values obtained are presented in column 1 of the Table.

EXAMPLE 2

A procedure analogous to that of Example 1 was followed. However, the mixture for the production of the binder consisted of 94% wt. of bitumen B 100 and 6% wt. of low density polyethylene. The measurement values obtained are listed in column 2 of the Table.

EXAMPLE 3

A procedure was followed analogous to Example 1. However, the mixture for the production of the binder consisted of 94% wt. of bitumen B 100 and of 6% wt. of ethylene propylene-diene copolymerizate The measurement values obtained are given in column 3 of the Table.

EXAMPLE 4

A procedure analogous to Example 1 was followed. However, the mixture for the production of the binder consisted of 94% wt. of bitumen B 100 and of 6% wt. of styrene-butadiene-styrene block polymerizate. The measurement values obtained are given in column 4 of the Table.

EXAMPLE 5

A procedure was followed analogous to Example 1. However, the mixture for the production of the binder consisted of 94% wt. of bitumen B 100 and 2% wt. of ethylene propylene-diene copolymerizate and 4% wt. of low density polyethylene. The measurement values obtained are given in column 5 of the Table.

EXAMPLE 6

A procedure was followed analogous to that of Example 1. However, the mixture for the production of the binder consisted of 94% wt. of bitumen B 100 and of 2% wt. of ethylene-propylene-diene copolymerizate and 4% wt. of high density polyethylene. The measurement values obtained are presented in column 6 of the Table.

EXAMPLE 7

The properties of the bitumen used in Examples 1 to 6 and those of a construction material analogously produced with this bitumen were compared. The measurement values obtained are given in column 7 of the Table.

EXAMPLE 8

The finished binder obtained according to Example 1 was subjected, while in a cooled state, to an X-ray spectral examination. A spectrum was obtained and this spectrum is designated by the letter a in FIG. 1. Further, a visually homogeneous mixture blended by simple agitation, which had the same composition as the mixture according to Example 1, was subjected while in a cooled state to the same X-ray spectral examination. A spectrum was obtained and this spectrum is designated by the letter b in FIG. 1. The polyethylene used in FIG. 1 was also subjected while in a cooled state to this X-ray spectral examination. A spectrum was obtained and this spectrum is designated by the letter b in FIG. 1. It is evident from these X-ray spectra that the strong spectral lines that are present in the spectrum designated by the letter c and which are caused by the crystalline structure of the polyethylene no longer appear in spectrum b. From this it follows that this mixture of bitumen and polyethylene, which was mixed by mere agitation, has virtually no crystalline structure present in the cooled state. In spectrum a there appears spectral lines which correspond to the strong spectral lines of spectrum c coming from the crystalline structure of the polyethylene. From this it is concluded that the binder produced according to Example 1 has at least a partially crystalline structure in the cooled state that has arisen from the molecular fragments of the polyethylene.

EXAMPLE 9

Figure 2A:
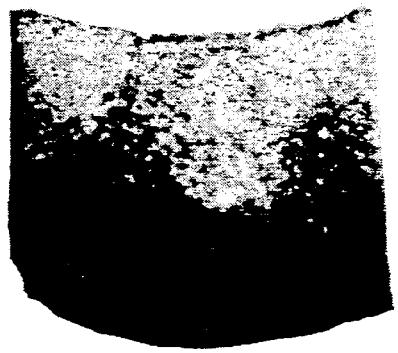
FIG. 2 discloses split surface views of a bituminous binder prepared according to the present invention and of a bituminous binder prepared according to prior art.
Figure 2B:
Figure 2C:

A sample of a binder was produced according to Example 2 from 94% wt. of bitumen B 100 and 6% wt. of low density polyethylene This was allowed to harden in a beaker, after which the body thus obtained was split open vertically. The split surface showed a homogeneous appearance upon illumination with visible light. Upon illumination with ultraviolet light, a dense pattern of uniformly distributed bright points on a darker background was visible. A figure of this split surface is designated by the letter a in FIG. 2. A further sample of this binder was stored for 24 hours at 160° C. in a beaker and was then allowed to cool in this beaker, after which the body that was obtained was split open. Upon illumination with ultraviolet light there was noted a bright layer which occupied approximately the upper third of the body subjected to storage. The remaining lower two-thirds of the body had a dark color. A figure of the split surface of this body is designated by the letter b in FIG. 2. This body was then remelted and this melt was thoroughly agitated at about 170° C., the melt after a few minutes achieving a fully homogeneous appearance.

EXAMPLE 10

A mixture was formed of the substances used in Example 2 having a composition of 94% wt. of bitumen B 100 and 6% wt. of low density polyethylene. This mixture was agitated for 1½ hours at 280° C. to form a homogeneous product. A sample of this product was then stored for 24 hours at 160° C. in a beaker and then allowed to cool, after which the body that had thus formed was split open. Upon illumination with ultraviolet light a bright layer was perceptible which had in its volume approximately the volume of the polyethylene constituent of the product and which in the preceding storage was located on the upper side. An illustration of the cleavage surface of this body is designated by the letter c in FIG. 2. This body was then melted and the melt thus obtained was again thoroughly agitated at about 280° C. This agitation had to be continued for over one hour in order to achieve a fully homogeneous appearance of the melt.

| | EXAMPLE | | | | | | |
|---|---|---|---|---|---|---|---|
| | 7<br>B 100 100% | 1<br>B 100 94%<br>HDPE 6% | 2<br>B 100 94%<br>LDPE 6% | 3<br>B 100 94%<br>EPDM 6% | 4<br>B 100 94%<br>SBS 6% | 5<br>B 100 94%<br>LDPE 4%<br>EPDM 2% | 6<br>B 100 94%<br>HDPE 4%<br>EPDM 2% |
| Softening point ring and ball °C. | 48.0 | 57.0 | 54.0 | 86.0 | 72.0 | 66.0 | 74.0 |
| Penetration at 25° C. 1/10 mm | 101.0 | 75.0 | 61.0 | 47.0 | 82.0 | 40.3 | 32.3 |
| Brittle point °C. | −9 | −10 | −10 | −21 | −15 | −15 | −14 |
| Binder content M % | 5.2 | 5.2 | 5.2 | 5.2 | 5.2 | 5.2 | 5.2 |
| Crude density g/cm$^3$ | 2.60 | 2.60 | 2.60 | 2.60 | 2.58 | 2.58 | 2.59 |
| Volumetric density g/cm$^3$ | 2.55 | 2.54 | 2.52 | 2.53 | 2.54 | 2.53 | 2.54 |
| Void content vol % | 1.9 | 2.3 | 3.1 | 2.7 | 1.6 | 1.8 | 1.9 |
| Stability "T" KN | 11.0 | 12.4 | 15.4 | 13.9 | 13.1 | 15.3 | 14.5 |
| Flow value "F" mm | 5.07 | 4.47 | 2.93 | 4.47 | 5.00 | 4.50 | 4.57 |
| Rigidity T/F KN/mm | 2.1 | 2.7 | 5.2 | 3.1 | 2.6 | 3.4 | 3.1 |
| Crushing strength/25° C./N/mm$^2$ | 0.81 | 1.04 | 1.43 | 1.27 | 0.78 | 1.41 | 1.39 |
| Crushing strength/40° C./N/mm$^2$ | 0.18 | 0.31 | 0.48 | 0.45 | 0.28 | 0.47 | 0.46 |
| E-modulus/25° C. N/mm$^2$ | 461 | 708 | 1197 | 909 | 461 | 1104 | 1096 |
| E-modulus/40° C. N/mm$^2$ | 110 | 202 | 456 | 327 | 189 | 320 | 304 |

-continued

| | 7 | 1 | 2 | 3 | 4 | 5 | 6 |
|---|---|---|---|---|---|---|---|
| EXAMPLE | B 100 100% | B 100 94%<br>HDPE 6% | B 100 94%<br>LDPE 6% | B 100 94%<br>EPDM 6% | B 100 94%<br>SBS 6% | B 100 94%<br>LDPE 4%<br>EPDM 2% | B 100 94%<br>HDPE 4%<br>EPDM 2% |
| Density overall g/cm$^3$ | 1.016 | 1.013 | 1.017 | 1.018 | 1.022 | 1.029 | 1.025 |

EXAMPLE 11

Using an apparatus of the type shown in FIGS. 3 and 4, a molten mixture having a concentration of bitumen B 100 of 94% by wt. and a high density polyethylene having a concentration of 6% by wt. is supplied to circular plate 1 having a diameter of 300 mm. The peripheral edge of the plate 1 was arranged at a distance of about 5 cm from impact surfaces 9 and rotated with a speed of 2,800 rpm. The mixture of bitumen and high density polyethylene was supplied to the center of the rotating plate at a temperature of about 170° C. by means of a pump 10. The velocity of the mixture as it left the centrifugal wheel 1 of the apparatus shown in FIG. 3 was about equal to the circumferential velocity of the wheel, i.e., about 45 meters/second. This is also the velocity at which the mixture strikes the impact surface. The mixture was recycled about 20 times between the impact surfaces 9 and the rotating plate 1 over a period of about 30 minutes. The bituminous binder produced with this apparatus and method had nearly the same properties as the binder prepared according the Example 1. An X-ray spectrum obtained for the material corresponded to the spectrum designated by letter a of FIG. 1. The binder also behaved in hot storage at 160° C. very similarly to that described in Example 9 by reference to FIG. 2b.

EXAMPLE 12

A binder was formed using an apparatus corresponding to that shown in FIG. 5. The apparatus was provided with a nozzle 20 having an inner diameter of 3 mm positioned at a distance of about 5 cm from an impact surface 24. A molten mixture composed of 94% by wt. of B 100 bitumen and 6% by wt. of a low density polyethylene was supplied to the nozzle 20. The temperature of the mixture was adjusted to about 195° C. and the velocity of the jet 23 emerging from the nozzle 20 was set at about 50 m/sec. The mixture was recycled about 30 times between the impact surface 24 and the nozzle 20 over a period of about 30 minutes. The bituminous binder obtained had nearly the same properties as the binder obtained according to Example 2. The X-ray spectrum of the binder corresponded substantially to that designated by letter a in FIG. 1. In addition, the binder obtained according to this example behaved under hot storage conditions of 160° C. in a manner similar as the binder described in Example 9 by reference to FIG. 2b.

The adjustment of the rate of supply of molten bituminous/thermoplastic material mixture limits the flow of this mixture to the rotating plate 1 or to nozzle 20 and has an effect similar to that of passing the mixture through a narrow gap.

What is claimed is:

1. A process for the production of a bituminous binder modified with thermoplastic synthetic material for use as a binding agent of a construction material comprising;

combining to form a mixture molten bitumen with a thermoplastic material which is relatively insoluble in bitumen, said thermoplastic material having a molecular weight greater than that of said bitumen; and mixing the bitumen and thermoplastic material mixture to effect homogenization by rapid acceleration followed by rapid braking of the mixture using an amount of kinetic energy corresponding to at least the difference between about the treatment temperature of the mixture and a temperature sufficient to cause the thermoplastic material to form reactive fragments which react to form a partially crystalline structure different than that of said thermoplastic material.

2. The process of claim 1 wherein the mixture is abruptly braked by impinging on an impact surface.

3. The process of claim 1 wherein said thermoplastic material comprises an olefin polymer.

4. A process according to claim 1 wherein the process is continued until a clear structural change in the mixture is ascertainable.

5. A process according to claim 4 wherein said clear structural change is determined by X-ray spectroscopy.

6. A process according to claim 3 wherein said thermoplastic material comprises a polyethylene.

7. A bituminous binder for construction materials prepared in accordance with the process of claim 1.

8. A bituminous binder for construction materials, prepared in accordance with the process of claim 2.

9. A bituminous binder for construction materials prepared in accordance with the process of claim 3.

10. A bituminous binder for construction materials prepared in accordance with the process of claim 4.

11. A bituminous binder for construction materials prepared in accordance with the process of claim 5.

12. A bituminous binder for construction materials, prepared in accordance with the process of claim 6.

* * * * *